United States Patent
Crytzer et al.

(10) Patent No.: US 9,738,551 B2
(45) Date of Patent: Aug. 22, 2017

(54) ADDITIVES FOR HEAT EXCHANGER DEPOSIT REMOVAL IN A WET LAYUP CONDITION

(75) Inventors: Kurtis R. Crytzer, Murrysville, PA (US); Lauren R. Weichel, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 262 days.

(21) Appl. No.: 13/449,730

(22) Filed: Apr. 18, 2012

(65) Prior Publication Data

US 2013/0281341 A1    Oct. 24, 2013

(51) Int. Cl.
| | |
|---|---|
| *C11D 17/00* | (2006.01) |
| *C02F 5/12* | (2006.01) |
| *C02F 1/70* | (2006.01) |
| C02F 1/68 | (2006.01) |
| C02F 5/14 | (2006.01) |
| C02F 1/66 | (2006.01) |
| C02F 103/02 | (2006.01) |

(52) U.S. Cl.
CPC .............. *C02F 5/125* (2013.01); *C02F 1/705* (2013.01); *C02F 1/66* (2013.01); *C02F 1/683* (2013.01); *C02F 5/145* (2013.01); *C02F 2103/023* (2013.01); *C02F 2209/06* (2013.01); *C02F 2303/08* (2013.01); *C02F 2303/22* (2013.01); *C02F 2305/04* (2013.01)

(58) Field of Classification Search
CPC .................................................... C11D 17/001
USPC ........................................... 510/109; 252/364
See application file for complete search history.

(56) References Cited

U.S. PATENT DOCUMENTS

| | | | | |
|---|---|---|---|---|
| 3,651,189 | A | * | 3/1972 | Anderson ..................... 205/735 |
| 3,981,740 | A | * | 9/1976 | Czajkowski ..................... 134/2 |
| 3,996,062 | A | * | 12/1976 | Frost et al. ..................... 134/2 |
| 4,357,254 | A | * | 11/1982 | Kapiloff et al. ............... 510/162 |
| 4,376,753 | A | * | 3/1983 | Lucas ........................... 376/305 |
| 4,435,303 | A | * | 3/1984 | Abadi ........................... 510/248 |
| 5,037,483 | A | * | 8/1991 | Dubin ............................. 134/3 |
| 5,423,969 | A | * | 6/1995 | Masumoto et al. ........ 204/196.1 |
| 5,660,736 | A | | 8/1997 | Bizot et al. |
| 6,310,024 | B1 | * | 10/2001 | Gill et al. ..................... 510/247 |
| 6,348,440 | B1 | * | 2/2002 | Meskers et al. ............... 510/253 |
| 6,736,905 | B2 | * | 5/2004 | Smith et al. ..................... 134/8 |
| 6,740,168 | B2 | | 5/2004 | Rootham et al. |
| 7,344,602 | B2 | | 3/2008 | Varrin et al. |
| 2004/0106534 | A1 | * | 6/2004 | Nitsch et al. ................ 510/220 |
| 2005/0247637 | A1 | * | 11/2005 | Sher ........................... C02F 5/04 210/697 |
| 2007/0039815 | A1 | | 2/2007 | Bartel |
| 2009/0298738 | A1 | * | 12/2009 | Kneipp ................. C11D 1/662 510/245 |

FOREIGN PATENT DOCUMENTS

| | | |
|---|---|---|
| EP | 1404489 B1 | 12/2004 |
| JP | 56102584 A | 8/1981 |
| JP | S62205293 A | 9/1987 |
| JP | 2003176997 A | 6/2003 |
| JP | 2004535546 A | 11/2004 |
| WO | 03/000464 A2 | 1/2003 |
| WO | 2004104270 A1 | 12/2004 |
| WO | 2005/108311 A1 | 11/2005 |

OTHER PUBLICATIONS

Tijing et al. Applied Thermal Engineering (31, 2011, 2025-2031.*
Ruelo et al. Desalination 313 (2013) 189-198.*
Kem Manufaccturing, Kemtreet, Aug. 2008.*
International Search Report for PCT/US2013/034773 dated Jul. 10, 2013 (Form PCT/ISA/210).
Written Opinion of the International Searching Authority for PCT/US2013/034773 dated Jul. 10, 2013 (Form PCT/ISA/237).
International Preliminary Report on Patentability for PCT/US2013/034773 dated Oct. 30, 2014 (Forms PCT/IB/326, PCT/IB/373, PCT/ISA/237).
European Patent Office, Extended European Search Report for European Application No. 13777885.8, mailed Apr. 4, 2016.
Buecker, "Fundamentals of Steam Generation Chemistry", Chapter 5: Chemical Treatment Programs for Steam Generating Systems, Mar. 31, 2009, pp. 221 and 222.

* cited by examiner

*Primary Examiner* — Nicole M Buie-Hatcher
*Assistant Examiner* — M. Reza Asdjodi
(74) *Attorney, Agent, or Firm* — Eckert Seamans Cherin & Mellott, LLC; Carol A. Marmo

(57) ABSTRACT

This invention relates to compositions and methods for the at least partial dissolution, disruption and/or removal of deposits, such as scale and other deposits, from heat exchanger components. The heat exchanger components can include pressurized water reactor steam generators. The pressurized water reactor steam generators can be in a wet layup condition. The compositions include elemental metal and complexing agent selected from the group consisting of sequestering agent, chelating agent, dispersant, and mixtures thereof. The methods include introducing the compositions into the heat exchanger components.

12 Claims, 2 Drawing Sheets

ADDITIVES FOR HEAT EXCHANGER DEPOSIT REMOVAL IN A WET LAYUP CONDITION

BACKGROUND

1. Field

This invention relates generally to compositions and methods for the dissolution, disruption and/or removal of deposits from a heat transfer component.

2. Description of Related Art

It is typical for metal surfaces which are exposed to water or aqueous solutions over extended periods of time in closed heat transfer systems to develop scales and/or become covered by deposits. For example, in commercial nuclear power plants, on-line operation at high temperature can cause shell and tube heat exchangers, such as pressurized water reactor steam generators, to develop adherent scales and/or deposits via deposition or in-situ formation on the metal surfaces of its internal structural parts, such as secondary side surfaces of tubes, tube sheets, and tube support plates. In general, during nuclear power plant operation in a pressurized water reactor, high temperature, radioactive water flows from the reactor core through the inside of the heat exchanger tubes in the steam generator, transferring heat through the walls of the tubes and into the non-radioactive water surrounding the tubes. This causes the non-radioactive water to boil and create the steam that is used for power generation. During the boiling process, scale and other deposits can accumulate on the tube surfaces, in crevices between the tube support plates, on the tube walls and on horizontal surfaces, such as tube sheets and the surfaces of tube support plates. The accumulation of the scale and deposits on the internal structural parts of the steam generator over an extended period of time can have an adverse impact on the operational performance and integrity of the steam generators. For example, problems observed at operating nuclear power plants have included inefficient boiling heat transfer, obstruction of cooling water flow, and creation of flow occluded regions resulting in local aggressive corrosive environments impacting the structural integrity of the pressure boundary and structural materials.

Thus, various cleaning methods have been developed to remove these scales and deposits which build-up on the internal surfaces of heat exchangers used to generate steam, such as shell and tube heat exchangers, particularly, pressurized water reactor steam generators, by dissolving and disrupting deposits. Such cleaning methods can include chemical cleaning using a variety of chelating agents at elevated temperature, employing scale conditioning agents at elevated pH, and flushing with high pressure water. These processes typically result in a slow deposit removal rate under ambient temperature conditions. Further, the reaction rate is controlled by temperature shifts, pH shifts or an increase in the concentration of the chelating agent.

It is an object of the embodiments described herein to provide compositions and methods for at least partial dissolution, disruption and/or removal of deposits, such as scale and other deposits, from heat transfer components, particularly steam generators in pressurized water reactors. It is desirable for the compositions and methods to be effective in the absence of elevated temperature and/or effective in elevated pH conditions, for example, during routine plant refueling outages at an operating nuclear power plant.

SUMMARY

These and other objects are achieved by the embodiments described herein which provide a composition and a method for at least partial disruption and removal of deposits from a heat transfer component. The composition includes an elemental metal in solid form and a complexing agent selected from the group consisting of sequestering agent, chelating agent, dispersant and mixtures thereof. The heat transfer component contains a liquid and the liquid has a pH from about 3.0 to about 12.5. The elemental metal can be selected from the group consisting of metals in their elemental state in solid form with electrochemical potentials anodic to low alloy steel. The elemental metal can be selected from the group consisting of zinc, beryllium, aluminum, magnesium, iron, lithium, and combinations thereof. In certain embodiments, the elemental metal is zinc in solid form. The metal can be in the form of slab, granule, powder, colloid form, coated particles and combinations thereof. The colloid form of the elemental metal can be selected from the group consisting of micron-sized particles, nano-sized particles and combinations thereof. The elemental metal can be present in an amount of from about 0.001 M to about 0.5 M based on the composition, or from about 0.005 M to about 0.1 M. The sequestering agent can be selected from the group consisting of acids and salts of, orthophosphates, polyphosphates, 1-hydroxyethylidene-1,1-diphosphonic acid, and mixtures thereof. The chelating agent can be selected from the group consisting of ethylenediamine tetraacetic acid, hydroxyethyl ethylenediamine triacetic acid, lauryl substituted ethylenediamine tetraacetic acid, polyaspartic acid, oxalic acid, glutamic acid diacetic acid, ethylenediamine-N,N'-disuccinic acid, gluconic acid, glucoheptonic acid, N,N'-ethylenebis-[2-(o-hydroxyphenyl)]-glycine, pyridine dicarboxylic acid, nitrilotriacetic acid, acids and salts thereof, and mixtures thereof. The dispersant can be selected from the group consisting of polyacrylic acid, polyacrylamide, polymethacrylate, and mixtures thereof.

In certain embodiments, the complexing agent can be present in an amount of from about 0.025 weight percent to about 2.5 weight percent based on the composition.

In certain embodiments, the composition can further include a reducing agent or oxygen scavenger. The reducing agent can be selected from the group consisting of ascorbic acid, citric acid, hydrazine, carbohydrazide, catalyzed hydrazine, hydroquinone, methylethylketoxime, diethylhydroxylamine, erythorbate, and mixtures thereof. The reducing agent can be present in an amount of from about 0.0025 weight percent to about 0.5 weight percent based on the composition.

In certain embodiments, the composition can further include water.

The method includes introducing into the heat transfer component an elemental metal in solid form and a complexing agent selected from the group consisting of sequestering agent, chelating agent, dispersant and mixtures thereof. The introducing of the elemental metal and the complexing agent can be performed in the absence of elevated temperature, external heat, or plant-applied heat source. The heat transfer component can contain a wet layup solution. Further, the introducing of the elemental metal and the complexing agent can be performed during a routine plant refueling outage, plant start-up or shut down.

Introducing of the elemental metal and the complexing agent can be in the shell side of the heat transfer component. The heat transfer component can be a steam generator in a pressurized water reactor and, the elemental metal and complexing agent can be introduced in the secondary or shell side of the heat transfer component.

BRIEF DESCRIPTION OF THE FIGURES

A further understanding of the invention can be gained from the following description of the preferred embodiments when read in conjunction with the accompanying figures in which.

DESCRIPTION OF THE PREFERRED EMBODIMENTS

Figure 1:
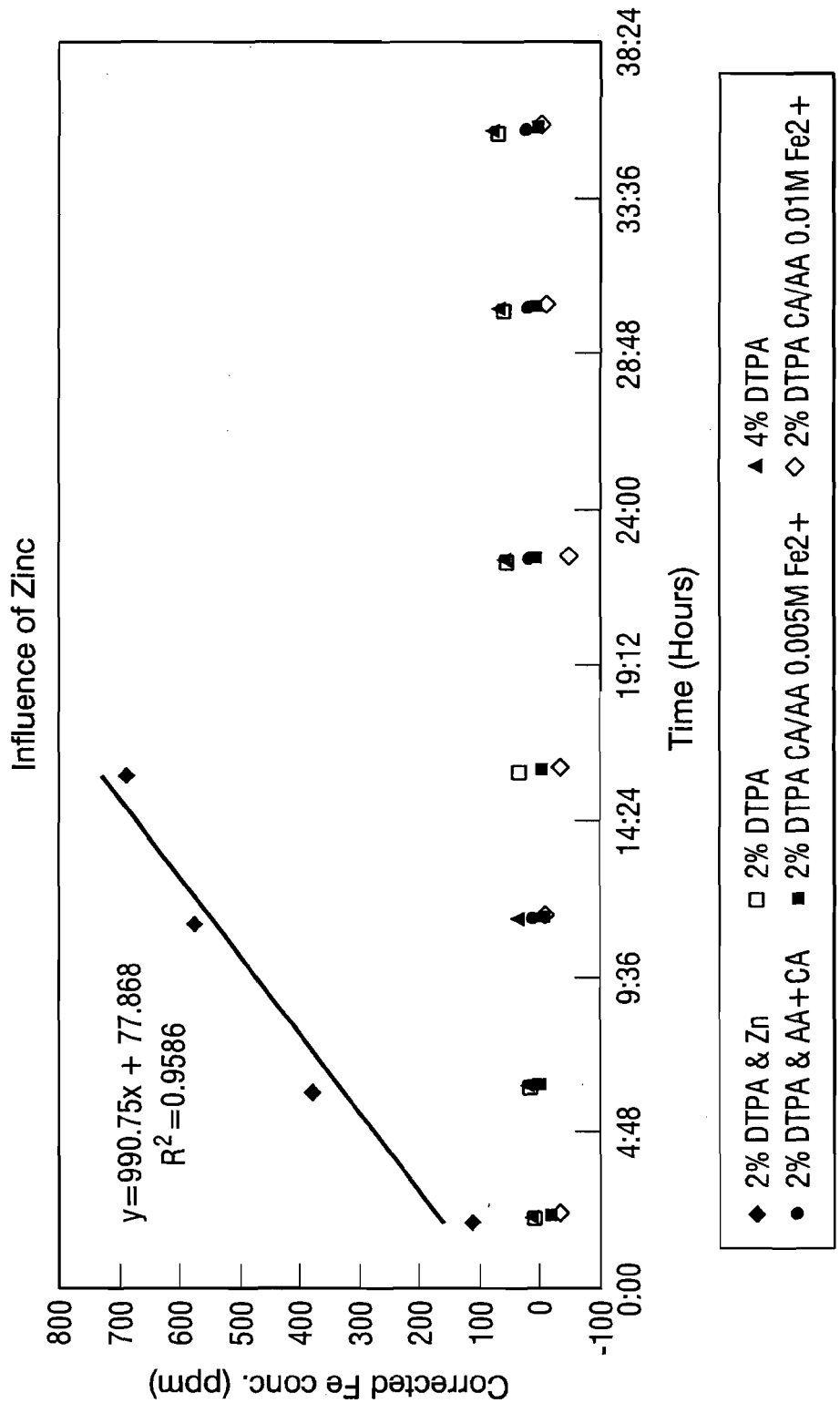
FIG. 1 is a plot showing the influence of elemental zinc on the dissolution of iron deposits, in accordance with certain embodiments of the invention.

The invention relates to compositions and methods for at least partial dissolution, disruption and removal of deposits from a heat transfer component. The deposits include scale, such as oxide scale, particularly, iron oxide scale, that build-up on surfaces of internal structural parts of the heat transfer component, such as heat transfer tubing. Further, the deposits can include other or ancillary contaminants such as aluminum, manganese, magnesium, calcium, nickel, and/or silicon morphologies, as well as deleterious species including copper and lead within the heat transfer system. The heat transfer component includes shell and tube heat exchanger(s). In certain embodiments, the heat transfer component is a pressurized water reactor steam generator.

The compositions and methods of the invention can be employed at ambient temperature, such as in the absence of system heat or an external heat source being applied to the heat transfer component. Further, the compositions and methods of the invention can be employed when the liquid contents, e.g., purified water, such as demineralized water, deionized water or mixtures thereof, of the heat transfer component has a pH in the range of from about 3.0 to about 12.5. Furthermore, in certain embodiments, the compositions and methods of the invention can be used on a pressurized water reactor steam generator while it is in a wet layup condition. In the wet layup condition, the pH of the contents of the heat transfer component is typically in the range of from about 9.0 to about 12.5.

The composition includes at least one metal in its elemental form and at least one complexing agent selected from the group consisting of sequestering agent, chelating agent, dispersant and mixtures thereof. The elemental metal can be selected from those known in the art. The elemental metal is in solid form. The elemental metal in solid form releases one or more of its electrons and the one or more electrons is/are accepted by the deposits resulting in disruption of deposits by the modification of surface charge, e.g., the lattice of the deposits or scale, which is built-up on an internal surface of the heat transfer component. The elemental metal can be selected from known metals in their elemental state in solid form with electrochemical potentials anodic to low alloy steel. In certain embodiments, the electrochemical potential of the elemental metal is more active than the potential of low alloy steel in the galvanic series of metals and alloys. Non-limiting examples of suitable elemental metals include zinc, beryllium, aluminum, magnesium, iron, lithium, and mixtures thereof. In certain embodiments, the elemental metal is zinc in solid form.

The sequestering agent and chelating agent can be selected from those known in the art. Suitable sequestering agents include acids and salts of, orthophosphates, polyphosphates, 1-hydroxyethylidene-1,1-diphosphonic acid, and mixtures thereof. Suitable chelating agents include ethylenediamine tetraacetic acid (EDTA), hydroxyethyl ethylenediamine triacetic acid (HEDTA), lauryl substituted EDTA, polyaspartic acid, oxalic acid, glutamic acid diacetic acid (GLDA), ethylenediamine-N,N'-disuccinic acid (EDDS), gluconic acid, glucoheptonic acid, N,N'-ethylenebis-[2-(o-hydroxyphenyl)]-glycine (EHPG), pyridine dicarboxylic acid (PCDA), nitrilotriacetic acid (NTA), acids and salts thereof, and mixtures thereof. The dispersant can be selected from those known in the art. Suitable dispersants include polyacrylic acid, amine neutralized polyacrylic acid, polyacrylamide, polymethacrylate, and mixtures thereof. In certain embodiments, the dispersant is polyacrylic acid. A non-limiting example of a suitable dispersant is commercially available under the trade name OptiSperse PWR 6600 from General Electric Company.

Without intending to be bound by any particular theory, it is believed that the elemental metal releases one or more electrons which is/are accepted by the deposits and as a result of the metal reacting with the deposits, a metal ion is released and a charge imbalance occurs at the deposit surface further destabilizing the deposit lattice. As a result, there is an increased rate of metal ion release. The dissociated metal ion is complexed by the sequestering agent and/or chelating agent. The dissociated metal ion can also be complexed by allowing the dissociated metal ion to precipitate and removing the colloidal precipitate using the dispersant.

In certain embodiments, elemental zinc reacts with iron oxide deposits causing release of an iron ion.

The amounts of elemental metal and complexing agent in the composition can vary and can depend on the specific selections for these components. In certain embodiments, the elemental metal is present in a molar equivalent of from about 0.001 M to about 0.5 M based on the composition. Further, in certain embodiments, the complexing agent is present in an amount such that it constitutes from about 0.025 to about 2.5 percent by weight of the composition, or from about 0.25 to about 2 percent by weight of the composition.

Still further, in certain embodiments, the compositions can include elemental metal in solid form, complexing agent and a remainder of water, e.g., demineralized water, deionized water or mixtures thereof, to form an aqueous solution. In these embodiments, the total concentration of the elemental metal and complexing agent within the aqueous solution is from about 0.025 weight percent to about 6.0 weight percent based on total solution, or from about 0.25 weight percent to about 3.0 weight percent based on total solution.

The compositions of the invention can further include an oxygen scavenger or reducing agent. The reducing agent can be selected from the group consisting of ascorbic acid, citric acid, hydrazine, carbohydrazide, catalyzed hydrazine, hydroquinone, methylethylketoxime, diethylhydroxylamine, erythorbate, and mixtures thereof. The reducing agent and/or oxygen scavenger can be present in an amount of from about 0.0025 weight percent to about 0.5 weight percent based on the composition, or from about 0.005 weight percent to about 0.1 weight percent based on the composition.

The methods of the invention include introducing the elemental metal and the complexing agent into the interior of a heat transfer component. Further, the oxygen scavenger and/or reducing agent can be optionally introduced into the interior of the heat transfer component. The order of introduction of these components can vary. For example, in certain embodiments, wet layup may be established in the steam generator and therefore, a pH agent and oxygen scavenger will be added to the water prior to adding the elemental metal and the complexing agent. The elemental metal and complexing agent can be introduced into, for example, the shell side of the heat transfer component, such as the secondary side of a steam generator of a pressurized water reactor. The introduction of these components into the heat transfer component causes them to come into contact and react with deposits, e.g., scale, contained on the surface of the internal structural parts of the heat transfer component.

Without intending to be bound by any particular theory, it is believed that the compositions and methods of the invention are effective to electrochemically disrupt the lattice(s) of the deposits which result in local morphology changes. For example, in certain embodiments, zinc in a colloidal or particulate form releases one or more electrons accepted by the lattice of the deposits. The reaction of the zinc with the deposits, e.g., iron oxide scale, in the heat exchanger component destabilizes the scale lattice and causes the release of ionic metals, such as iron, from the oxide to form soluble iron. As previously described, the soluble iron is then complexed with the complexing agent, i.e., sequestering agent and/or chelating agent, or allowed to precipitate and then removed with the use of a dispersant.

Introduction into the heat transfer component can include combining the elemental metal and the complexing agent, and introducing this mixture into the heat transfer component, e.g., the secondary or shell side of the heat transfer component. Further, a reducing agent and/or oxygen scavenger optionally can be combined with the elemental metal and the complexing agent. Furthermore, as previously described, in certain embodiments wherein an aqueous solution is formed, the elemental metal, complexing agent and optionally, reducing agent and/or oxygen scavenger, can be combined with water. The water can be added to the composition prior to introduction into the heat transfer component or, alternatively, the source of the water can be that which is present in the heat transfer component. As previously discussed, the order of the addition of these components is not critical.

In certain embodiments, the elemental metal and complexing agent can be separately introduced into the heat transfer component. In these embodiments, the order of addition of these components is not critical. For example, the elemental metal can be introduced into the secondary side of the pressurized water reactor steam generator followed by introduction of the complexing agent, or coincident with the complexing agent, or the elemental metal can be introduced after the introduction of the complexing agent.

The methods of the invention can be carried out at a variety of temperatures and are typically conducted in the absence of elevated temperatures, e.g., without system heat or an external heat source being applied to the heat transfer component and/or its contents. For example, in certain embodiments, the methods of the invention are carried out at ambient temperature.

In certain embodiments, for a pressurized water reactor steam generator, the methods of the invention are carried out when the steam generator is in a wet layup condition. The wet layup condition can be established prior to, during or following the injection of the elemental metal, e.g., zinc. The wet layup condition is described as follows. The system is partially filled or fully filled with purified water, such as demineralized water, deionized water, or mixtures thereof, and has a pH of 9.0 or higher. This wet layup pH is typically established by the presence of at least one pH control agent. The pH control agent can be selected from a variety of those known in the art. In certain embodiments, the following materials can be added to the water in solely or in combination to control pH: ammonium hydroxide, ammonia in equilibrium with ammonium hydroxide, trialkyl ammonium hydroxide, tetramethyl ammonium hydroxide, borates and amines, such as ethanolamine, diethylhydroxylamine, dimethylamine, AMP-95, methylpropylamine, morpholine, and the like. If used in the water, the pH control agent or blend of pH control agents is/are present in an amount of sufficient to achieve a pH within a range of from about 9.0 to about 12.5, or from about 9.0 to about 10.5, or from about 9.8 to about 10.5. Further, the wet layup solution may optionally include an oxygen scavenger. The oxygen scavenger can be selected from a variety of those known in the art. In certain embodiments, the oxygen scavenger includes carbohydrazide, hydrazine, hydroquinone and mixtures thereof. If used in the layup solution, the oxygen scavenger is typically present in an amount such that its concentration is 25 ppm or greater based on the wet layup solution. The wet layup solution in the heat transfer system may be recirculated, or it can remain static, or it can be mixed via laminar flow, turbulent flow or ultrasonic cavitation, or it may be purged or sparged with an inert gas, such as nitrogen, to maintain reducing conditions.

In certain embodiments, the invention can include a rinse process to remove from the heat transfer component the deposits which were dissolved, disrupted and/or removed from the internal surfaces as a result of introducing the elemental metal and complexing agent. The rinse may occur via direct draining then refilling or multiple fills and drains with demineralized water or via a feed and bleed method with the heat exchanger out of service or in service with demineralized water, or demineralized water with an oxygen scavenger and pH agent added.

As previously described herein, the methods of the invention can be carried out when the contents of the heat transfer component has a pH in the range of from about 3.0 to about 12.5. Further, within this pH range, in certain embodiments, elemental zinc in the composition reacts with deposits, such as magnetite, or the wet layup solution to generate zinc cations. The zinc cations provide corrosion protection to carbon and low alloy steel and therefore, the corrosion rates using the methods of the invention may be lower as compared to corrosion rates using known chemical cleaning processes. In addition, zinc is often used in the primary side of pressurized water reactors as a corrosion inhibitor for nickel-based and other austenitic alloys. Thus, the presence of zinc cations in solution allows for corrosion protection of the austenitic materials during wet layup and once the heat exchanger is placed back in service following the cleaning process.

The compositions and methods of the invention are effective to accomplish at least partial dissolution, disruption or removal of scale and deposits without causing excessive corrosion of carbon and low alloy steel structural components within the steam generator and without using a corrosion inhibitor.

The advantages of these compositions and methods include at least the ability to implement without the addition of heat or a heat source and during routine plant refueling outage activities in a PWR nuclear power plant. Further, this process can be applied when the primary side is drained and used without impacting eddy current data collection or steam drum inspection schedules. It could be conducted as a routine application at the end of fuel cycles, upon start-up and shut down, or during extended mid-cycle outages.

EXAMPLES

Example 1

Testing occurred in ambient laboratory conditions ranging from approximately 65° F. to approximately 75° F. with corresponding solution temperatures measured and recorded using a calibrated infrared thermometer. Initial baseline testing was performed on a variety of complexing agents neutralized from their acid form including (ethylenediaminetetraacetic acid (EDTA), diethylenetriaminepentaacetic acid (DTPA), gluconic acid, glucoheptonic acid, pyridinedicarboxylic acid (PCDA), iminodiacetic acid (IDA), ethylenediaminedisuccinic acid (EDDS)) at three separate concentrations (0.5 weight %, 1.0 weight %, and 2.0 weight %) to determine their respective reaction rates under wet layup conditions. Each sample was prepared in a solution with a pH above 9.8 and with 300 ppm to 400 ppm of carbohydrazide. All solutions were brought to the appropriate pH with 1 ml of ethanolamine and final adjusted with ammonium hydroxide. The pH of each solution was recorded. Test volumes were 250 ml with approximately 8 grams of magnetite added and the sample bottles were capped. "Time Initial" baseline testing occurred over a 72 hour period with samples drawn every 2 to every 6 hours depending on corresponding iron concentration changes. Sample aliquots of 1 ml were pulled and triple filtered through filter paper. The concentration of iron was determined via UV in accordance with the ASTM E 394-09 method. The intent of the initial testing was to identify suitable complexing agents for use in wet layup solutions, which were environmentally friendly while maintaining the capability of removing deposits under ambient wet layup conditions. The results of the testing determined that the complexing agent DTPA performed well and better than EDTA by approximately a factor of two with respect to iron concentration at corresponding times. EDDS, gluconic acid, and other complexing agents tested initially demonstrated insufficient performance for the duration of wet layup with negligible magnetite dissolution over the 72 hour period. In addition, it was determined that the increased concentrations of chelating agent had a negligible effect on reaction rate for magnetite dissolution.

Example 2

These tests were conducted with DTPA and EDTA and were performed under the same volume, pH, oxygen scavenger, temperature (~67° F.) and magnetite concentrations as used in Example 1. Because of the low iron concentrations in the Example 1 test phase, the iron test method was switched to inductively coupled plasma optical emission spectroscopy (ICP-OES). These tests included samples with and without the addition of the known reducing agents, citric acid and ascorbic acid, at 0.1 weight percent (individually and in combination) in conjunction with the carbohydrazide already present in the wet layup solution. In addition, various concentrations (0.005 M to 0.05 M) of neutralized ferrous ion were added to the solution to determine the influence of the ferrous ion on the magnetite/complexing agent reaction kinetics. Samples were pulled and the time was recorded approximately every two hours in the initial 12 hours of testing and every 4 hours thereafter. Each sample size was approximately 1 ml. The samples were filtered through a 0.45 μm syringe filter. The results of these tests demonstrated that there was no change in reaction rate as a result of increasing DTPA concentration, which was tested up to 4 weight %, in wet layup conditions. In addition, citric acid and ascorbic acid used individually or in combination inhibited the reaction rate of the DTPA complexing agent with magnetite. At approximately 0.1 M ferrous ion concentration, the reaction rate was marginally influenced. At the same time of preparation of the samples mentioned above, the elemental metal sample test was prepared and evaluated in conjunction with the other samples. A sample was prepared in accordance with previous descriptions herein, including 2% DTPA and approximately 0.1 M zinc. At approximately two hours, the test apparatus was pressurized and required venting. The zinc had a significant and clear influence on reaction rate as illustrated in FIG. 1.

Figure 2:
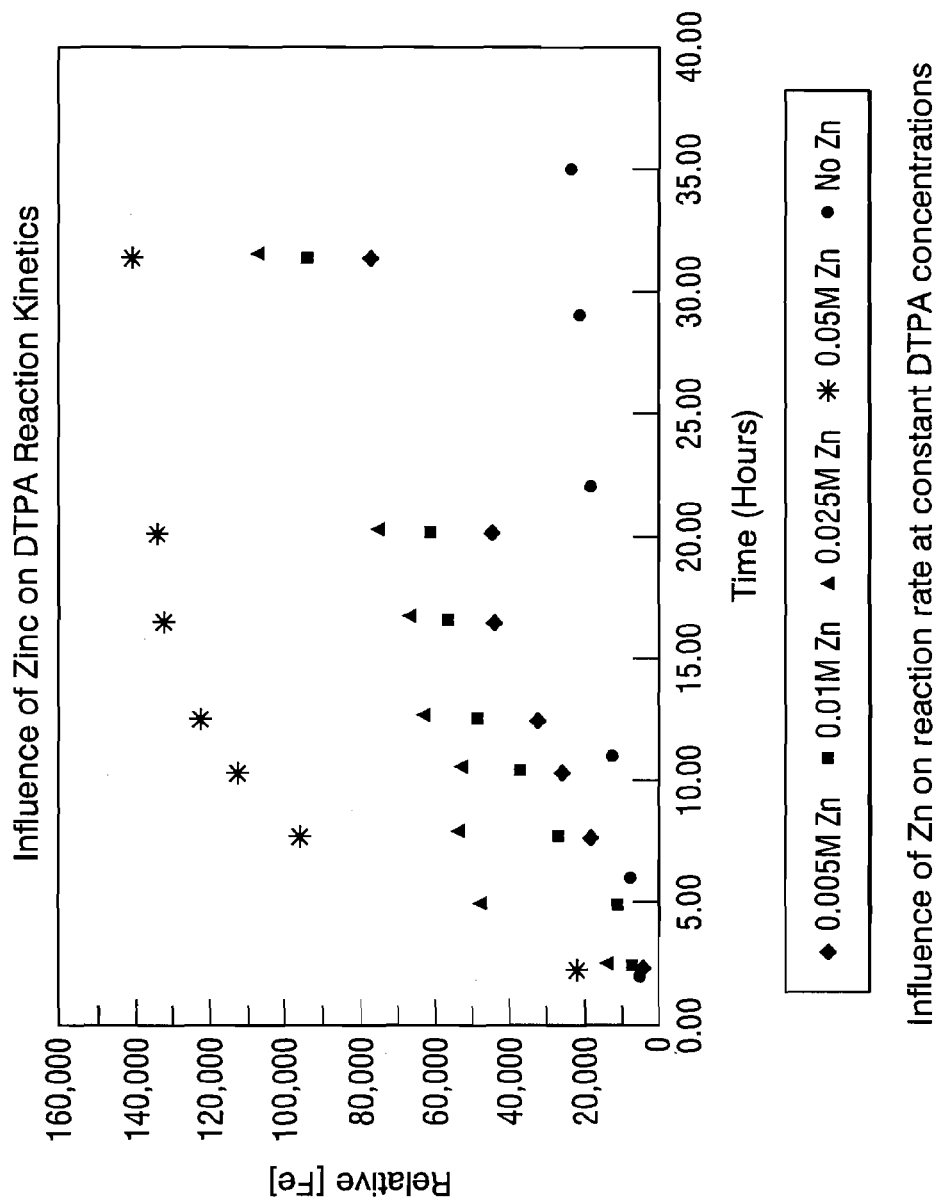
FIG. 2 is a plot showing the influence of elemental zinc concentrations on the reaction rate of DTPA with iron deposits in wet layup solutions at ambient temperature conditions, in accordance with certain embodiments of the invention.

Additional testing was performed under the same conditions but varying the zinc concentration. As observed in FIG. 2, zinc concentration has a direct influence on the reaction rate of the dissolution of magnetite in elevated pH conditions with a constant concentration of complexing agent. Organic reducing agents citric and ascorbic acid again showed an inhibitive effect on iron dissolution. EDTA was also included in this testing and zinc had a clear influence on the dissolution rate of magnetite.

Testing was also performed on actual plant tube scale samples for 24 hours under ambient wet layup conditions with 1% DTPA and 0.01 M zinc. The test results showed a reduction in deposit mass of approximately 7 percent to 17 percent within 24 hours, depending upon the scale deposits, which were from three separate utilities.

DTPA was selected because upon neutralization it could be precipitated and removed with filtration. However, it has a similar affinity towards iron and zinc, which resulted in total iron values lower than the stoichiometric capacity of DTPA. With the function of zinc clearly established, and its independence on any particular chelating agent, recent tests occurred where zinc was tested with EDDS and gluconic acid, with similar reaction rate results to EDTA and DTPA. Without intending to be bound by any particular theory, it was believed that elemental zinc was controlling the reaction rate irrespective of the complexing agent. Thus, the invention provides the ability to use a more environmentally friendly complexing agent or a more cost beneficial complexing agent while providing deposit dissolution and scale disruption under the low temperature, high pH conditions of wet layup. Zinc and iron can simply be precipitated and filtered to be effectively removed from the waste water if the appropriate environmentally friendly complexing agent is selected. Zinc salt was also included in the tests to confirm that the preferred embodiment was required to exist in the elemental form, and this was confirmed. Zinc salt had no significant influence in the dissolution rate of deposits in wet layup conditions even in the presence of a complexing agent, namely EDTA.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A composition for at least partial disruption or removal of oxide scale, consisting of:

water at ambient temperature having a pH from about 9.0 to about 12.5;

from about 0.001 M to about 0.5 M based on the composition, of at least one elemental metal additive to the water, selected from the group consisting of zinc, beryllium, aluminum, magnesium, iron, lithium, and mixtures thereof, in particulate or colloid form being effective to release one or more electrons to interact with the scale and to result in release of one or more dissociated ions from the scale;

a complexing agent additive to the water, selected from the group consisting of sequestering agent, chelating agent, and mixtures thereof;

optionally a dispersant;

optionally an oxygen scavenger;

optionally a pH control agent; and optionally a reducing agent, wherein, the oxide scale is deposited on a surface of a secondary side, internal part of a steam generator in a pressurized water reactor.

2. The composition of claim 1, wherein the elemental metal is zinc.

3. The composition of claim 1, wherein the colloid form is selected from the group consisting of micron-sized particles, nano-sized particles, and combinations thereof.

4. The composition of claim 1, wherein the sequestering agent is selected from the group consisting of acids and salts of orthophosphates, polyphosphates, 1-hydroxyethylidene-1,1-diphosphonic acid, and mixtures thereof.

5. The composition of claim 1, wherein the chelating agent is selected from the group consisting of ethylenediamine tetraacetic acid, hydroxyethyl ethylenediamine triacetic acid, lauryl substituted ethylenediamine tetraacetic acid, polyaspartic acid, oxalic acid, glutamic acid diacetic acid, ethylenediamine-N,N'-disuccinic acid, gluconic acid, glucoheptonic acid, N,N'-ethylenebis-[2-(o-hydroxyphenyl)]-glycine, pyridine dicarboxylic acid, nitrilotriacetic acid, acids and salts thereof, and mixtures thereof.

6. The composition of claim 1, wherein the dispersant is selected from the group consisting of polyacrylic acid, polyacrylamide, polymethacrylate and mixtures thereof.

7. The composition of claim 1, wherein the elemental metal and complexing agent are together present in an amount of from about 0.025 weight percent to about 6.0 weight percent.

8. The composition of claim 1, further comprising a reducing agent or oxygen scavenger.

9. The composition of claim 8, wherein the reducing agent can be selected from the group consisting of ascorbic acid, citric acid, hydrazine, carbohydrazide, catalyzed hydrazine, hydroquinone, m ethylethylketoxime, diethylhydroxylamine, erythorbate, and mixtures thereof.

10. A composition for at least partial disruption or removal of oxide scale, consisting of:

water at ambient temperature having a pH from about 9.0 to about 12.5;

from about 0.001 M to about 0.5 M based on the composition, of at least one elemental metal additive to the water, selected from the group consisting of zinc, beryllium, aluminum, magnesium, iron, lithium, and mixtures thereof, in particulate or colloid form being effective to release one or more electrons to interact with the scale and to result in release of one or more dissociated ions from the scale;

a chelating agent;

optionally a dispersant;

optionally an oxygen scavenger;

optionally a pH control agent; and optionally a reducing agent, wherein, the oxide scale is deposited on a surface of a secondary side, internal part of a steam generator in a pressurized water reactor.

11. The composition of claim 1, wherein the complexing agent additive constitutes from about 0.025 weight percent to about 2.5 weight percent based on total weight of the composition.

12. The composition of claim 10, wherein the chelating agent constitutes from about 0.025 weight percent to about 2.5 weight percent based on total weight of the composition.

* * * * *